(12) United States Patent
Kapteyn et al.

(10) Patent No.: US 6,793,865 B2
(45) Date of Patent: Sep. 21, 2004

(54) GAGE THICKNESS MEASUREMENT BY USE OF INDUCTIVE SENSORS

(75) Inventors: Kelvin L. Kapteyn, Royal Oak, MI (US); James Michler, Phillips, WI (US)

(73) Assignee: Textron Automotive Company Inc., Troy, MI (US)

( * ) Notice: Subject to any disclaimer, the term of this patent is extended or adjusted under 35 U.S.C. 154(b) by 327 days.

(21) Appl. No.: 09/780,919

(22) Filed: Feb. 9, 2001

(65) Prior Publication Data

US 2001/0022212 A1 Sep. 20, 2001

Related U.S. Application Data

(60) Provisional application No. 60/181,942, filed on Feb. 11, 2000.

(51) Int. Cl.⁷ .............................. B23K 26/38; G01B 7/06
(52) U.S. Cl. ................. 264/400; 264/40.1; 219/121.69; 425/141; 324/229; 324/230; 324/231
(58) Field of Search ................................ 264/400, 40.1; 425/141; 324/229, 231, 228, 230; 219/121.08, 121.69

(56) References Cited

U.S. PATENT DOCUMENTS

| 4,157,503 A | * | 6/1979 | Brunner ..................... 324/231 |
| 4,870,359 A | * | 9/1989 | Takahashi ................... 324/229 |
| 5,072,967 A | | 12/1991 | Batchelder et al. ......... 280/732 |
| 5,082,310 A | | 1/1992 | Bauer ......................... 280/732 |
| 5,316,822 A | | 5/1994 | Nishijima et al. .......... 428/138 |
| 5,355,083 A | * | 10/1994 | George et al. .............. 324/229 |
| 5,632,914 A | | 5/1997 | Hagenow et al. ....... 219/121.71 |
| 5,865,059 A | * | 2/1999 | Alessandro ................... 73/159 |
| 6,294,124 B1 | * | 9/2001 | Bauer et al. ................ 264/400 |
| 6,423,933 B2 | * | 7/2002 | Nicholas et al. .......... 219/121.7 |

FOREIGN PATENT DOCUMENTS

| GB | 2 035 566 A | * | 6/1980 |
| GB | 2 217 835 A | * | 11/1989 |
| JP | 58-123402 | * | 7/1983 |

* cited by examiner

Primary Examiner—Stefan Staicovici
(74) Attorney, Agent, or Firm—Grossman, Tucker, Perreault & Pfleger, PLLC

(57) ABSTRACT

A measuring gage for determining the thickness of a non-metallic material utilizes an inductive sensor positioned on one side of the material to be measured and a metallic object placed on the opposite side. The output of the sensor is used to determine the distance between the sensor and the metallic object, and hence the thickness of the material. The movement of the sensor and the metallic object can be computer controlled to map the thickness of the material along a predetermined path and produce a cross-sectional thickness profile. The output of the sensor can be used in conjunction with a computer controller responsible for adjusting the size of a score line to prepare an airbag deployment section in a vehicle trim panel.

13 Claims, 3 Drawing Sheets

GAGE THICKNESS MEASUREMENT BY USE OF INDUCTIVE SENSORS

CROSS REFERENCE TO RELATED APPLICATIONS

This application claims the benefit of copending U.S. provisional patent application Serial No. 60/181,942 filed Feb. 11, 2000, the teachings of which are incorporated herein by reference.

FIELD OF THE INVENTION

This invention relates to the use of a linear analog sensor to measure thickness of non-metallic skin material, such as polymeric skin material. More specifically, the present invention relates to the use of a linear analog sensor to measure the thickness of polymeric skin material suitable for use on an automotive instrument panel, to thereby provide more accurate information regarding skin thickness for other manufacturing steps that require accurate skin thickness determinations, such as laser scoring or weakening of the skin at a desired location for placement of an air-bag deployment system.

BACKGROUND OF THE INVENTION

In various commercial assembly applications, there remains a constant need to develop a reliable technique to more accurately provide information regarding thickness of a non-metallic component, such as a polymeric material, which includes plastic or elastomeric type skin material. Such information, of course, would be critically needed in those situations where the polymer material at issue requires another downstream manufacturing operation, which may rely upon skin thickness as a critical variable.

For example, in the automotive field, a variety of disclosures exist concerning the creation of a tear seam for the purpose of improving the performance of an air bag deployment system. Examples of such air bag cover tear seams are disclosed in U.S. Pat. Nos. 5,072,967; 5,082,310; 5,316,822 and 5,632,914. As disclosed therein, tear seams are prepared by forming such seam in the backside of a polymeric skin material. In addition, the seams are provided in various configurations, with the most common having a C, H, U or X-shape and wherein the pattern ultimately defines the number of air bag deployment doors required in the substrate.

That being the case, in the course of manufacturing skin material for use on an instrument panel, wherein the skin must be weakened at selected locations, it is critical to have some reliable indication of skin thickness, so that the weakening, scoring or tear seam formation, which occurs in a downstream process, can be properly regulated. That being the case, there remains a constant need to develop reliable techniques to evaluate thickness in non-metallic/polymeric type skin materials.

Of course, to date, a number of techniques have been advanced to measure thickness of a given non-metallic part. For example, it has been known to use lasers or other optical means to scan the surface of a fixture, followed by a subsequent scan after the plastic skin or shell is placed therein. Such method has been found to provide inconsistent thickness measurements due to varying reflectivity of the surface and a variety of other unknown factors.

Accordingly, it is an object of this invention to overcome the disadvantages of prior art designs and provide a new apparatus and method for detecting part thickness in non-metallic/polymeric type materials.

SUMMARY OF THE INVENTION

In broad aspect, the present invention relates to a linear analog inductive sensor apparatus that is employed to measure the thickness of a non-metallic/polymeric type material at any point along the surface thereof. In method form, the invention relates to placing the sensor in contact with the surface of the non-metallic surface, whose thickness is to be determined, wherein the non-metallic material is itself placed over a metallic target material. The sensor thereby detects and measures the distance between its contact point on the surface, to the target, which therefore provides an accurate and reliable measure of the non-metallic material thickness. The invention herein therefore can be applied to any non-conducting material, such as plastic or a composite/laminate material, rubber or fabric.

In further aspect the present invention relates to a process for measuring and recording the thickness of an automotive trim panel material to generate a cross-sectional thickness profile comprising the steps of contacting a first surface of the material at a plurality of positions with an inductive sensor, contacting a second and opposite surface of the material at a corresponding plurality of positions with a metallic object, converting the output of the sensor into a value that represents the thickness of the material at said plurality of positions, generating a cross-sectional profile of thickness in said material as between said plurality of positions, and communicating said cross-sectional profile of thickness in said material to a controller which is in communication with a cutting assembly to cut said material to a desired thickness, wherein said controller adjusts the thickness of a cut into said material based upon said cross-sectional profile thickness in said material to provide a cut of desired thickness.

In alternative embodiment the present invention relates to a process for measuring and recording the thickness of an automotive trim panel material to generate a cross-sectional thickness profile comprising the steps of contacting a first surface of the material at a first position with an inductive sensor, contacting a second and opposite surface of the material with a metallic object, converting the output of the sensor into a value that represents the thickness of the material at said first position, contacting said first surface of the material at a second position with said inductive sensor, contacting a second opposite surface of the material at said second position with a metallic object, converting the output of the sensor into a value that represents the thickness of the material at said second position, and generating a cross-sectional thickness profile in said material as between said first and second positions.

In yet further alternative embodiment, the generated cross-sectional thickness profile is communicated to a controller which is in communication with a cutting assembly to cut said material to a desired thickness, wherein said controller adjusts the thickness of a cut into said material based upon said cross-sectional profile thickness in said material to provide a cut of desired thickness.

DETAILED DESCRIPTION OF THE PREFERRED EMBODIMENTS

As noted, the invention herein relates to a linear analog device for the measurement of part thickness. Preferably, the analog device is an inductive sensor made by OMRON, Model E2CA-X2A, which itself is connected to an E2CA-AN4D amplifier unit.

The sensor is then positioned on the surface of the non-metallic part to be measured. With attention to FIG. 1, as shown therein, the inductive sensor 10 is shown positioned above the non-metallic material surface 12 to be measured. Such nonmetallic material may include any type of material that is non-conductive, such as synthetic polymeric material, including, but not limited to a thermoplastic, thermoplastic elastomer, thermoset material, etc. More specifically, non-metallic material 12 may include a thermoplastic polyester or polyurethane type material, in particularly, a polyurethane skin material, poly(vinyl chloride), or other types of polymeric material used as skin material on automotive instrument panel applications.

Figure 1:
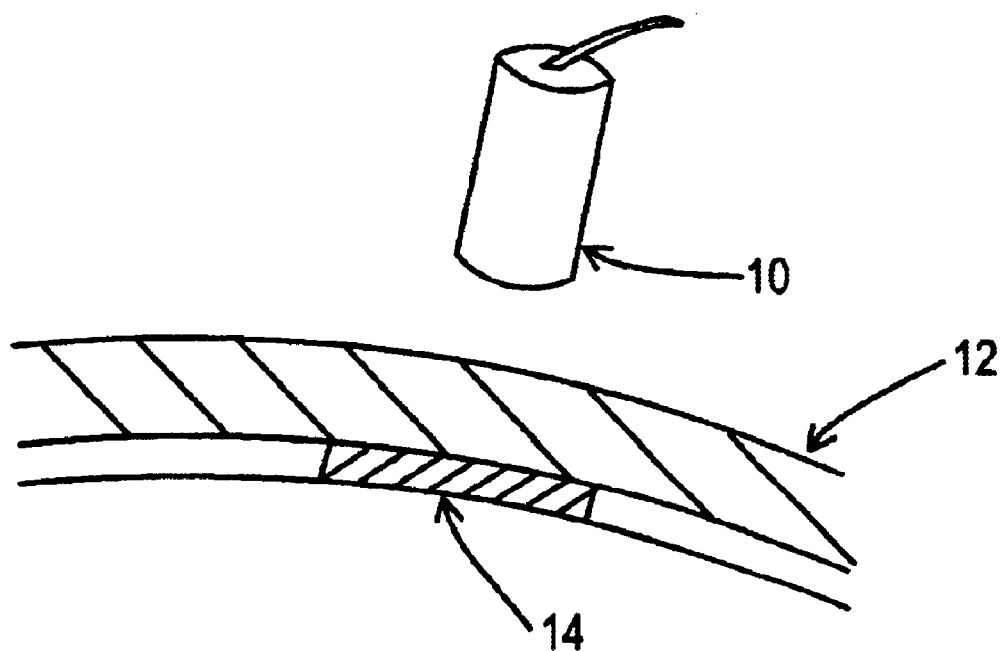
FIG. 1 illustrates the inductive sensor of the present invention before application to the surface of indicated plastic shell material.

As also shown in FIG. 1, the non-metallic material 12 is positioned over a conductive metallic material 14, which ultimately serves as the target for the inductive device 10. With attention directed at FIG. 2, inductive sensor 10 is positioned in contact with non-metallic material 12, at location 16, over conductive target 14. At such time, sensor 10 will provide measurement of the distance or thickness 18 from sensor 10 to target 14. Furthermore, although not shown, sensor 10 can be located anywhere along non-metallic material 12, to provide a reliable statistical distribution of thickness 18 for the purposes of properly informing other downstream manufacturing operations that require an accurate assessment of thickness values.

In accordance with the present invention, which has been found to be preferably applied to the measurement of a skin thickness in a non-metallic material (e.g., polyurethane elastomeric skin) prior to application on an automotive instrument panel, various levels of thickness have been successfully evaluated. For example, sensor 10 conveniently provides thickness determinations between 0.001"–0.500", and at all ranges there between, at reducing thickness values of 0.001". For example, thickness determinations have been established between values of 0.002"–0.499". 0.003"–0.498", etc. In a most preferred embodiment, thickness values between 0.020"–0.065" are determined, which is a typical range for a non-metallic skin material in an automotive instrument panel application.

With respect to the target material 14, as noted, such material is conducting material, such as stainless steel, which thereby communicates with the sensor 10 to provide a selected thickness determination. Preferably, such target material is stainless steel at a thickness of 0.010", but other thickness can be used, provided it is sufficient to communicate with device 10.

Figure 2:
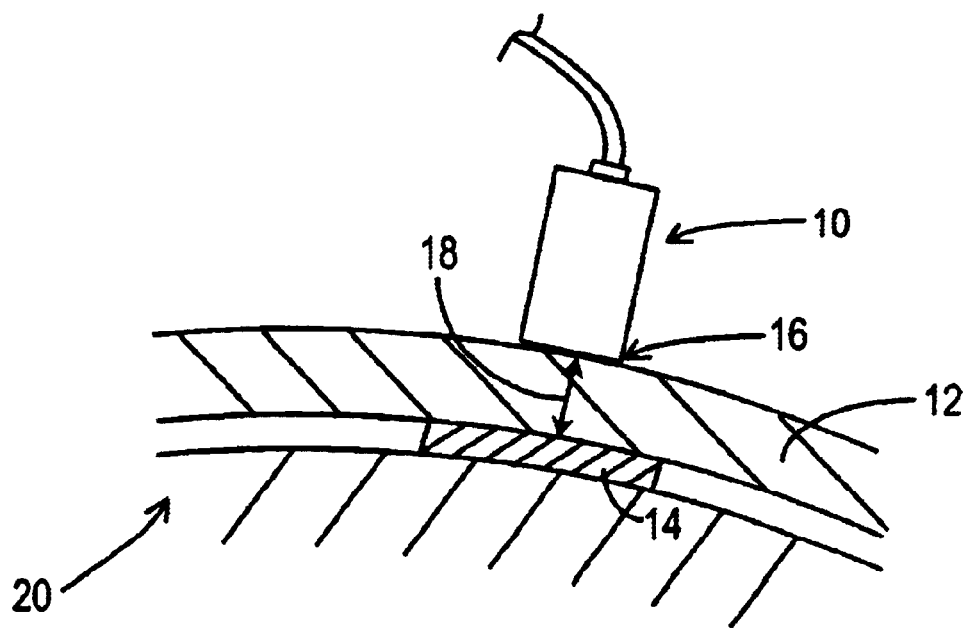
FIG. 2 illustrates the inductive sensor of the present invention as applied to the indicated plastic shell material.

Also, as shown in FIG. 2, surrounding the target material 14 is a nest or fixture 20, which supports the target material 14 so that it is properly positioned to communicate with the sensor 10 as disclosed herein. Fixture 20 may itself be conveniently made from a thermoset resin such as an epoxy resin, with sufficient rigidity to serve as a support structure.

In an alternative embodiment, the thickness of the non-metallic material 12, for example an automotive instrument panel, is measured using the sensor 10 while the panel is still in the mold. Instrument panels can be formed using many different molding processes. Many instrument panels are formed using a slush molding process. These molds are typically formed of a metallic material such as nickel. After the panel is formed, but before it is removed from the mold, the thickness of the part can be measured and stored for later use. The sensor 10 uses the nickel mold as the target to determine the thickness of the panel. The sensor can measure the thickness of the panel along a predetermined path. The predetermined path may be a path where an air bag opening will be formed by a later process. The thickness of the part along the predetermined path for a corresponding panel can be saved in memory for later use when forming a score line for an airbag deployment section.

Also, as can be appreciated, the sensor device 10 may be conveniently applied to an automated robotic type assembly, such that the robotic arm selectively positions the sensor device 10 at a desired location for thickness evaluation. In that regard, it has been found that an important and useful aspect is to ensure that the sensor device 10 is connected to the robotic arm via a flexible or spring-loaded mechanism, such that the robotic arm can position the sensor 10 on the surface, and the flexible mechanism there-between ensures proper contact with the surface for a desired thickness measurement. Stated another way, the placement of the sensor 10 on a flexible mechanism or spring loaded assembly allows the robotic arm to position and align the sensor 10 on a given surface, and apply pressure thereto, and any excess pressure would be relieved by the flexible mechanism, while ensuring that the sensor 10 provides appropriate surface contact to allow for proper thickness measurement.

The preferred inductive sensors for use herein are linear analog inductive sensors. They are available in versions that produce either 4 mA to 20 mA output signals, or a 0V to 10V type output signals. Accordingly, such current output or voltage output is then conveniently correlated to part thickness by standard calibration techniques using samples of known part thickness.

In an even more preferred embodiment of this invention, and as noted above, the inductive sensor herein is made to output its thickness reading to an analog/digital (A/D) converter, which digital signal is then inputted to a computer controller responsible for adjusting the thickness of a score line to be imparted to a polymeric skin material, which material is employed for the purpose of preparing an airbag deployment section on an automotive instrument panel. Such digital signal can be conveniently delivered to such computer controller by a computer serial connection, USB cable connection, etc. That being the case, the inductive sensor herein, as coupled to, e.g., the computer controller on a laser scoring apparatus, would provide the laser apparatus reliable information on polymeric skin thickness, for the purpose of forming a controlled thickness tear seam in any desired configuration. The invention herein therefore is directed at an automated system, comprising the inductive sensor, coupled to a downstream manufacturing operation (such as laser scoring), through the use of a computer interface, which accepts thickness determinations and considers such information as applied to said given downstream manufacturing operation.

In addition, the inductive sensor may also be coupled to an upstream molding operation, through a computer interface, which accepts thickness determination and considers such information as applied to said molding operation thereby instructing said molding operation to either increase or decrease thickness as may be desired. Control of thickness may be accomplished, e.g., by adjusting the amount of material charged into the mold, mold temperature, mold cooling, molding pressure and/or time for the overall molding cycle.

Figure 3:
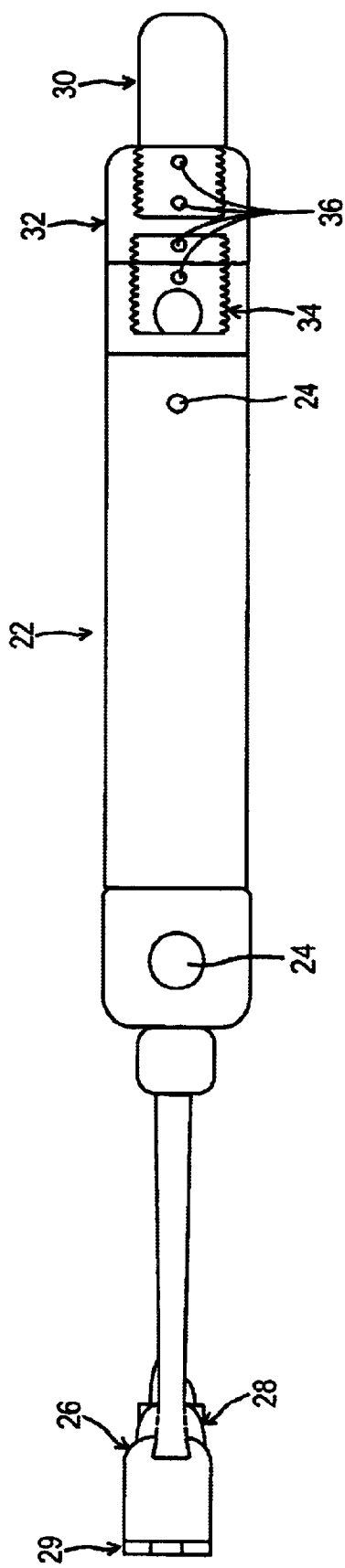
FIG. 3 illustrates the use of the inductive sensor herein, as applied to an automated robotic assembly.

Finally, attention is directed to FIG. 3, which as noted above, illustrates the use of the inductive sensor holder as attached to an automated robotic assembly. Specifically, an SMC air cylinder (NCMC 106-0200C) is shown generally at 22, which contains a pair of air discharge openings 24, which contains a spring inserted therein (not shown). A shaft distance of approximately 2.25" is set between the end of the cylinder 22 and the top of the sensor holder 26. The sensor holder is threaded onto the shaft, along with a locking nut 28. A nut is placed at 29.

At 30 is illustrated the preferred Nachi robot mounting adaptor with a length of about ⅞. A machined brass adaptor is shown at 32, along with a threaded insert at 34, and a plurality of locking screws identified at 36. The overall length of the robotic assembly shown in FIG. 3 is about 10.75", with a spring size therein (not shown) of 2.0"×⅝".

What is claimed is:

1. A process for measuring and recording the thickness of an automotive trim panel material comprising the steps of:
   providing an automotive trim panel polymeric material having a known shape, an outer surface and an inner surface defining a thickness of between 0.001–0.500 inches, and a region in which the thickness of said trim panel material maybe measured;
   providing a holding form having essentially the same shape as at least a portion of said trim panel material of known shape wherein the portion of the holding form which corresponds to the region of the trim panel material to be measured is metallic;
   contacting the outer surface of said automotive trim panel material with said holding form such that said region to be measured is in contact with said metal;
   contacting the inner surface of the material at a first position in the region to be measured with a shielded inductive sensor;
   and generating a first output signal;
   converting the first output signal of the sensor into a value that represents the thickness of the material at said first position;
   contacting the inner surface of the material at a second position with said inductive sensor;
   and generating a second signal;
   converting the second output signal of the sensor into a value of electrical current or voltage that represents the thickness of the material at said second position, and
   generating a cross-sectional thickness profile of said material as between said first and second positions.

2. The process of claim 1 wherein the sensor is a linear analog sensor.

3. The process of claim 1 including the step of communicating said cross-sectional thickness profile in said material to a controller which is in communication with a cutting assembly to cut said material to a desired thickness, wherein said controller adjusts the thickness of a cut into said material based upon said cross-sectional profile thickness in said material to provide a cut of desired thickness.

4. The process of claim 3 wherein said cutting assembly comprises laser scoring.

5. The process of claim 3, wherein said sensor is attached to a robotic arm and the sensor is moved from the first position to the second position by said robotic arm.

6. The process of claim 3, wherein the sensor is mounted on a flexible mechanism to promote contact between the sensor and the material.

7. The process of claim 1, wherein the automotive trim panel is an instrument panel.

8. The process of claim 3, wherein the automotive trim panel material forms an air bag opening upon deployment of an air bag and said cut of said trim panel material weakens said material for air bag deployment.

9. The process of claim 1 including the step of communicating said cross-sectional thickness profile in said material to a controller which is in communication with a molding operation for said automotive trim panel material which controller instructs said molding operation, to adjust molding conditions to thereby adjust thickness of the material exiting the mold based upon said cross-sectional thickness profile in said material to provide a material of substantially uniform thickness.

10. The process of claim 3 wherein said controller is additionally in communication with a molding operation for said automotive trim panel material wherein said controller instructs said molding operation to adjust molding conditions to adjust thickness of the material exiting the mold based upon said cross-sectional thickness profile in said material to provide a material of substantially uniform thickness.

11. The process of claim 10 wherein said adjustment of molding conditions to adjust thickness comprises adjusting the amount of material provided in the mold.

12. The process for measuring and recording the thickness of an automotive trim panel material comprising the steps of:
   providing an automotive trim panel polymeric material having a known shape, an outer surface and an inner surface defining a thickness of between 0.001–0.500 inches, and a region in which the thickness of said trim panel material may be measured;
   providing a holding form having essentially the same shape as at least a portion of said trim panel material of known shape wherein the portion of the holding form which corresponds to the region of the trim panel material to be measured is metallic;
   contacting the outer surface of said automotive trim panel material with said holding form such that said region to be measured is in contact with said metal;
   contacting the inner surface of the material at a plurality of positions in the region to be measured with a shielded inductive sensor to generate a plurality of output signals,
   converting said output signals into a value of electrical current or voltage that represents the thickness of the material at said plurality of positions;
   generating a cross-sectional thickness profile in said material as between said plurality of positions; and
   communicating said cross-sectional thickness profile in said material to a controller which is in communication with a cutting assembly to cut said material to a desired thickness, wherein said controller adjusts the thickness of a cut into said material based upon said cross-sectional profile thickness of said material to provide a cut of desired thickness.

13. The process of claim 12 wherein the automotive trim panel provides an air bag opening and said cut of said trim panel material weakens said material for air bag deployment.

* * * * *